Dec. 1, 1959 K. WILFERT 2,915,321
TORSION ROD SPRING SYSTEM FOR VEHICLES
ESPECIALLY MOTOR VEHICLES
Filed June 10, 1954 2 Sheets-Sheet 1
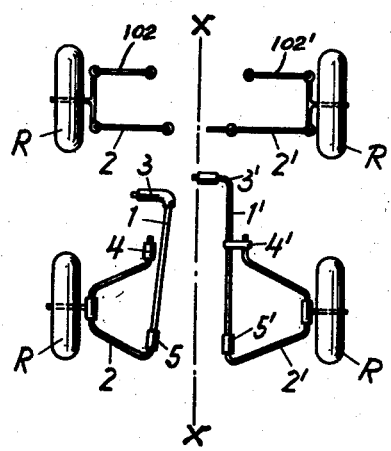
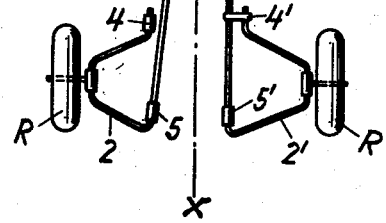
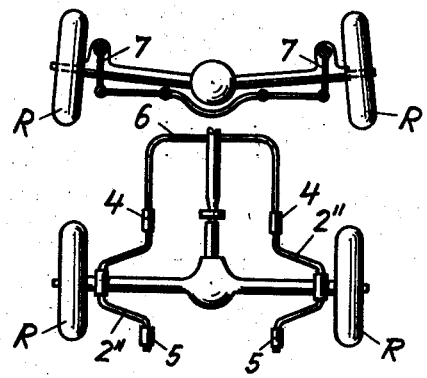
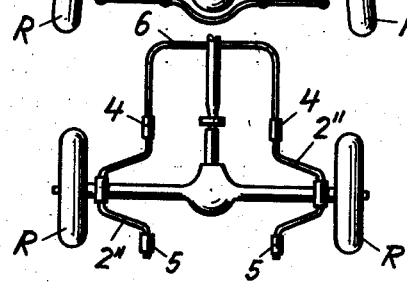
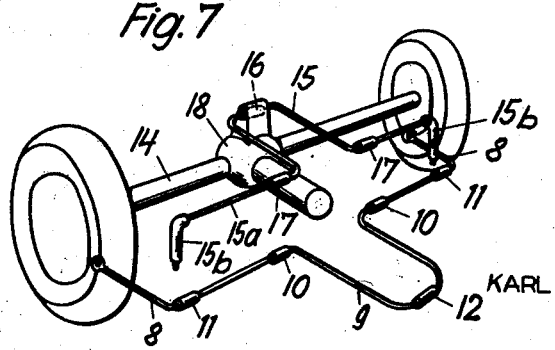
INVENTOR
KARL WILFERT
BY
ATTORNEYS Dec. 1, 1959 K. WILFERT 2,915,321
TORSION ROD SPRING SYSTEM FOR VEHICLES
ESPECIALLY MOTOR VEHICLES
Filed June 10, 1954 2 Sheets-Sheet 2
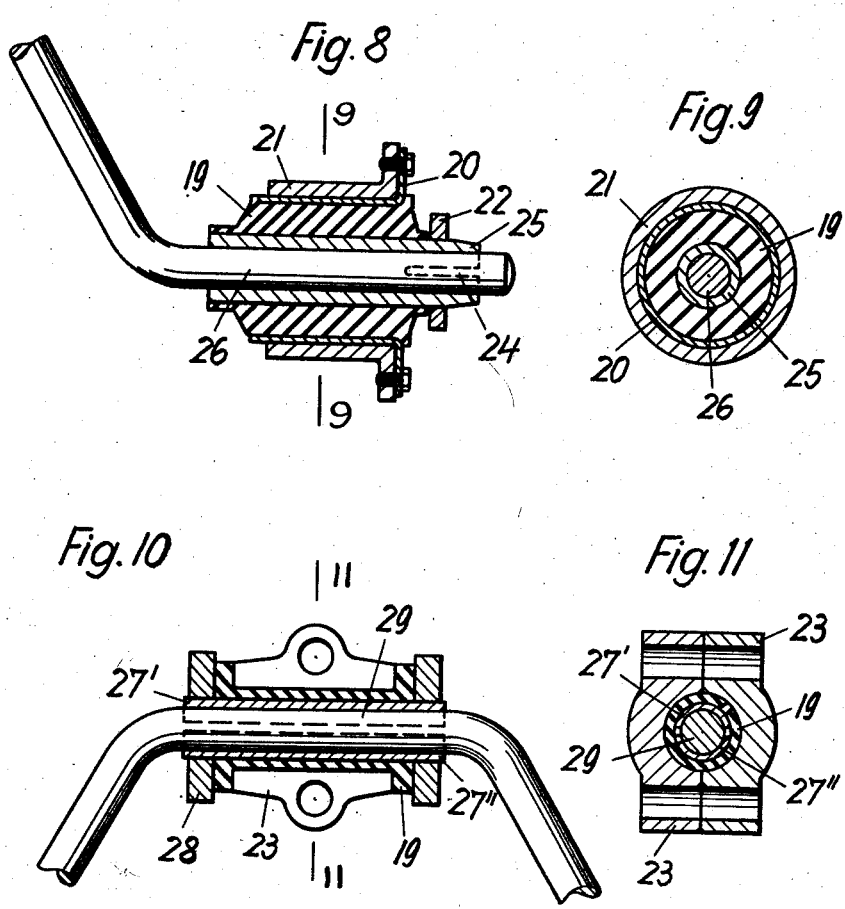
INVENTOR
KARL WILFERT
BY Dicke and Craig
ATTORNEYS

United States Patent Office 2,915,321
Patented Dec. 1, 1959

2,915,321

TORSION ROD SPRING SYSTEM FOR VEHICLES ESPECIALLY MOTOR VEHICLES

Karl Wilfert, Stuttgart-Degerloch, Germany, assignor to Daimler-Benz Aktiengesellschaft, Stuttgart-Unterturkheim, Germany Application June 10, 1954, Serial No. 435,845

Claims priority, application Germany July 1, 1953

10 Claims. (Cl. 280—124)

The present invention relates to a torsion rod spring system for vehicles, especially for motor vehicles. More particularly, the present invention relates to a novel, improved and simplified suspension of the wheels of motor vehicles by means of torsion rod springs which are bent suitably for the purpose hereinabove described.

Accordingly, it is an object of the present invention to provide a simplified wheel suspension, and particularly, a simplified and improved arrangement of guide links for the wheels.

It is a further object of the present invention to provide guide links for the wheels which are formed as torsion rods and which may take the place of the ordinary guide links used heretofore in accordance with wheel suspensions.

It is still another object of the present invention to provide a guide link in the form of a torsion rod which may be installed easily and which dispenses with the ordinary guide link system in wheel suspensions, thereby greatly reducing the cost involved in the manufacture and assembly thereof.

It is another object of the present invention to provide an improved system of guide links for the wheels of motor vehicles which are in the form of torsion rods bent either U-shaped or V-shaped, and which dispenses with the necessity of two guide links, namely, an upper and a lower guide link for each wheel as used heretofore, a single torsion rod guide link in accordance with the present invention being sufficient for purposes of guiding the wheel.

It is still another object of the present invention to provide a torsion rod guide link system for the wheels of motor vehicles wherein the torsion rods used with two wheels are joined into a single spring.

It is still another object of the present invention to provide a combined spring suspension for the wheels and for the axles of these wheels which are each guided springily independent of one another by means of torsion rods.

A still further object resides in the provision of bearings, particularly so-called metal-rubber bearings, which are particularly suitable for supporting the torsion rods of the present invention and which absorb the axial thrusts and shearing forces produced in the bearings by means of positive abutments or stopping members.

The present invention consists essentially in that a torsion rod is bent at an angle in such a manner as to directly constitute a guide link for the wheel of a motor vehicle. In particular the guide link of the present invention consists of a bow-like, U-shaped or V-shaped portion formed in the torsion rod. By the direct and immediate use of the torsion rod as guide link for the wheel, it is possible to dispense either entirely or at least partially with special pivotal arrangements and connections of additional guide link members for the wheels, which simplifies the wheel suspension very considerably. The bow-shaped bent-out portion of the torsion rod also permits to dispense with the use of special thrust rods or struts.

Any desired effective length of the spring may be utilized by bending back the torsion rod upon itself and supporting the same at the desired bent-back portion. This also enables a supporting along the extreme end of the vehicle.

Further objects, features and advantages of the present invention will become obvious from the following description when taken in connection with the accompanying drawing which shows, for purposes of illustration only, several preferred embodiments in accordance with the present invention and wherein:

Figure 1 shows a front view of a wheel suspension and guide link system having substantially a quadrangular guiding arrangement in accordance with the present invention.

Figure 2 is a plan view of the wheel suspension of Figure 1 showing only one guide link thereof, for example, the lower guide link, with the torsion rod inclined with respect to the longitudinal axis x—x of the vehicle and provided with an end bent outwardly for supporting the rod thereat.

Figure 3 is a front view of a different embodiment of a wheel suspension and guide link system in accordance with the present invention similar to Figure 1.

Figure 4 is a plan view of the guide link system of Figure 3, showing only one guide link, for example, the lower guide link the torsion rod of which is substantially parallel to the longitudinal axis of the vehicle and which is provided with an end bent inwardly for supporting the rod thereat.

Figure 5 is a view in elevation of a spring system of two opposed vehicle wheels in accordance with the present invention in which the two spring members on both sides of the vehicle are joined to form a unitary spring system.

Figure 6 is a plan view of the embodiment shown in Figure 5.

Figure 7 is a perspective view of still another embodiment in accordance with the present invention showing a dual spring suspension system.

Figure 8 shows a longitudinal sectional view of one bearing support for the end of the torsion rod in accordance with the present invention.

Figure 9 is a cross-sectional view along line 9—9 of Figure 8.

Figure 10 shows a longitudinal sectional view of still another embodiment of a bearing for use with the torsion rod spring suspension in accordance with the present invention, and Figure 11 is a cross-sectional view along lines 11—11 of Figure 10.

The simplest realization of the present invention is obtained by the use of a straight torsion rod which may be arranged transversely, obliquely or parallel to the longitudinal direction and which is more or less angularly bent. The wheel is connected to the end of the angularly bent portion of the torsion rod in any suitable manner either rigidly or pivotally by means of suitable pins or the like.

With the occurrence of larger forces it becomes necessary to brace the spring by means of thrust rods or struts of known construction as such. However, such arrangement may be dispensed with if the angularly bent portion of the torsion rod is itself angularly shaped, as will be.come more obvious from the following description of the present invention.

Referring now more particularly to the drawing wherein like reference numerals are used throughout the various views thereof to designate like parts, the longitudinal central vertical plane of the vehicle is designated with $x$—$x$ in Figures 1 through 4, in which the vehicle wheels, which may be the front vehicle wheels, are designated with the reference character R.

In the embodiment according to Figures 1 and 2, the lower guide link is formed by a substantially straight torsion rod 1 which is arranged at an angle with respect to the axis $x$—$x$. The torsion rod 1 in accordance with the present invention is shaped at either the forward or rearward end thereof into a U-shaped bow 2 which serves directly and immediately as guide link for the wheel R, and behind which lies the torsion rod 1 which is bent backwardly and supported with its backwardly bent end on a fixed part of the vehicle by means of an outwardly bent portion 3. Bearings 4 and 5 are provided at the free end of the bow portion 2 and near the place where the bend begins, respectively for supporting the torsion rod in any suitable manner on a fixed part of the vehicle, such as, for example, frame, chassis, self-supporting body, etc. The upper guide link 102 may be formed similarly to the lower guide link 2 except that the bow-portion thereof is provided with a smaller bow in a transverse direction of the vehicle, as clearly shown in Figure 1.

The embodiment according to Figures 3 and 4 differentiates itself from that of Figures 1 and 2 in that the torsion rod is arranged parallel to the vehicle longitudinal axis $x$—$x$, and the bow-shaped portion 2', constituting the lower guide link for the vehicle, properly speaking, is somewhat longer. The embodiment in which the torsion rod is somewhat longer is preferred especially for the lower guide links. The bearings 4' and 5' serve similar purposes as bearings 4 and 5 of Figures 1 and 2. The bearing 4' of the embodiment of Figures 3 and 4 also serves simultaneously as a second bearing for the torsion rod 1' which in this embodiment is supported on a fixed part of the vehicle by means of an inwardly bent free end portion 3'. The upper guide link 102' may be formed similarly to the lower guide link 2' except that the bow-portion thereof is provided with a smaller bow in the transverse direction of the vehicle, as clearly shown in Figure 3.

The torsion rod in accordance with the present invention is not necessarily as long as to surpass the width of the bow portion. It is also possible to make the torsion rod 1 only as long as the bow portion is wide, or may be even shorter, so as to terminate, for example, immediately at the bearing 5. However, the indicated arrangement is preferable by reason of the greater effective spring length obtained thereby.

The spring member for each individual vehicle wheel R forms a part by itself in the described spring arrangements of Figures 1 to 4. However, in supporting one or more front or rear wheels of a four-wheeled vehicle, a similar arrangement may continue to extend either in the longitudinal direction of the vehicle or in the cross-direction of the vehicle or in a vertical direction for use with the same wheel or for use with a neighboring vehicle wheel either on the same or opposite side of the vehicle, as shown, for example, in Figures 5 and 6.

In the embodiment illustrated in Figures 5 and 6 the guide links 2'' pass over into a common bow-shaped portion 6 which extends transversely to the vehicle.

In the embodiment according to Figures 5 and 6, which may be used for suspension of rear vehicle wheels, each wheel R is provided only with a lower guide link which is effectively connected with the half axle by means of the shackle or leg 7. It is understood that the guide links and spring suspension embodiments in accordance with the present invention described hereinabove may serve only for the upper or only for the lower guide link or for both the upper and lower guide links of the wheels, whereby the individual guide links need not have the same shape but may be used in any desired combination according to the shown and described embodiments.

A particularly advantageous double spring arrangement is shown in Figure 7. A torsion rod guide link 8, 8 is provided therein for each vehicle wheel R. The two guide links 8, 8 pass over into a central bow portion 9 which extends in the longitudinal direction of the vehicle either forwardly or rearwardly.

The bearings 10 are provided at the points of transition to the central bow 9. A further bearing 11, 11 is also provided at each outer bend of the torsion rod and finally the bow portion 9 itself is once more supported by bearing 12 located substantially in the center of the bow.

The axle 14 which is formed as a swinging rigid axle is also supported by a similarly shaped spring 15, 15a and 15b. This spring consists of a central bow portion 15 which extends either forwardly or rearwardly, the bent leg portions 15a, 15a which are supported firmly by bearings 15b, 15b. The bow 15 is supported through a centrally located bearing 16. Furthermore, a bearing 17, 17 each is also provided at the place of the inner bends. The bearing 16 is fastened, for example, to the differential housing 18 or to a part projecting upwardly therefrom.

The bearings envisaged for the present invention are strictly pivot bearings. They may take on the form of friction or sleeve bearings as well as roller bearings. It is prefered, however, to use either metal-rubber bearings or self-lubricating bearings of synthetic material. However, it is required of all bearings that they be able to absorb axial thrusts or shearing forces. For that purpose an axial abutment of any well-known construction may be used, such as, for example, a collar, a sleeve, or a screw.

Figures 8 and 9 show one preferred embodiment for the bearings used for the end of a rod or bow. The bearing illustrated in Figures 8 and 9 may correspond, for example, to the bearings 4, 4' and 5, 5' of Figures 1 through 6.

A so-called metal-rubber bushing 19 is fastened on the end of the torsion rod. The bushing 19 is fastened at the vehicle frame or a similar part 21 of the vehicle frame by means of a flange 20 provided with a bore to receive suitable fastening means, such as a bolt or a screw. The axial forces are absorbed by means of a ring 22 which may be shrunk on the inner sleeve 25 of the metal-rubber or synthetic self-lubricating bearing 19 thereby firmly pressing the end of the inner sleeve 25, which is formed springily by means of a slit 24, on the end of the torsion rod 26.

The bearing according to Figures 10 and 11 which correspond to the bearings 10, 11, 16 and 17 of Figure 7, is formed of two parts and is held together by two flanges 23 provided with appropriate bores to receive suitable fastening means such as bolts or screws, which may serve simultaneously for purposes of fastening of the bearing to the vehicle frame or the like. The inner sleeve consists of halves 27' and 27'' split in the longitudinal direction which are secured on the torsion rod bow 29 by means of rings 28 shrunk on the halves 27' and 27''.

The bow portions of the torsion rod in accordance with the present invention may be connected in any suitable manner with the wheel carrier as shown in Figures 1 through 4 and 7 or with the axles of the wheel as shown in Figures 5 and 6.

I claim:

1. A torsion rod spring system for motor vehicle wheels comprising a torsion rod including an angularly-bent bow-like portion forming a guide link for a wheel of the vehicle, said bow-like portion including two arms lying substantially in a horizontal plane with a middle part of said bow-like portion between said arms extending substantially in the longitudinal direction of the vehicle, means for connecting said middle part to a vehicle wheel, bearing means at a fixed part of the vehicle for supporting said torsion rod near each of the opposite ends of said bow-like portion to permit swinging movement of said bow-like portion enabling vertical displacement of said wheel, said rod including a further portion extending from one end of said bow-like portion in the longitudinal direction of the vehicle, means for restraining rotation of said extended rod portion to provide torsional resistance in the latter against upward displacement of said wheel, all of said rod portions consisting of integral parts of a single continuous rod having substantially uniform cross-sectional area along its length and being resilient throughout its length.

2. A torsion rod spring system according to claim 1, wherein said rod is reversely bent near one end of said bow-like portion, whereby said further rod portion extends therefrom generally in the direction of the other end of said bow-like portion.

3. A torsion rod spring system for motor vehicle wheels comprising a first angularly-bent bow-like rod of torsionally resilient material forming a guide link for a wheel of the vehicle, a second angularly-bent bow-like rod of torsionally resilient material forming another guide link for a wheel of the vehicle, each of said bow-like rods including two arms lying substantially in a horizontal plane with a middle part of each said bow-like portion between said arms extending substantially in the longitudinal direction of the vehicle, means for connecting each of said middle parts to a vehicle wheel, bearing means at a fixed part of the vehicle for supporting said rods near the opposite ends of each to provide vertical wheel-guiding pivoted movement about respective axes generally longitudinally of the vehicle, at least one of said rods having at one end an integral torsionally resilient extension in the longitudinal direction of the vehicle, each said last-mentioned rod and its extension having substantially uniform cross-sectional area along their entire length and being torsionally resilient throughout, said bow-like rods being located one above the other with their middle parts connected to the same vehicle wheel, and means for restraining rotation of each said extension to provide torsional resistance in the latter against upward displacement of a respective bow-like rod.

4. A torsion rod spring system for motor vehicle wheels comprising a first angularly-bent bow-like member of torsionally resilient material forming a guide link for a wheel of the vehicle, a second angularly-bent bow-like member of torsionally resilient material forming another guide link for a wheel of the vehicle, each of said bow-like members including two arms lying substantially in a horizontal plane with a middle part of each said bow-like member between said arms extending substantially in the longitudinal direction of the vehicle, means for connecting each of said middle parts to a vehicle wheel, bearing means at a fixed part of the vehicle for supporting said members near the opposite ends of each to provide vertical wheel-guiding pivoted movement about respective axes generally longitudinally of the vehicle, each of said members having at one end an integral torsionally resilient extension in the longitudinal direction of the vehicle, means for restraining rotation of each said extension to provide torsional resistance in the latter against upward pivotal displacement of a respective bow-like member, said bow-like members and each torsionally resilient extension consisting of integral parts of a single continuous torsion rod having substantially uniform cross-sectional area along its entire length and being torsionally resilient throughout its length.

5. A torsion rod spring system according to claim 4, wherein said bow-like members are guide links connected to separate vehicle wheels respectively.

6. A torsion rod spring system according to claim 5, wherein said separate wheels are disposed opposite each other at opposite sides of the vehicle.

7. A torsion rod spring system according to claim 1, wherein said bearing means includes rubber-metal bushings through which said rod passes.

8. A torsion rod spring system according to claim 1, wherein said bearing means includes self-lubricating bushings made of synthetic material through which said rod passes.

9. A torsion rod spring system according to claim 1, wherein said bearing means includes structure firmly secured to said rod and stop means cooperating therewith for absorbing axial forces of said rod in said bearing means.

10. A torsion rod spring system according to claim 1, wherein said bearing means includes metal-rubber bushings, said bushings being provided with an inner metal bushing structure, ring means shrunk over said inner bushing structure, and longitudinal slits in said inner bushing structure to permit said ring means to fixedly secure the inner metal bushing on said rod.

References Cited in the file of this patent

UNITED STATES PATENTS

| | | |
|---|---|---|
| 352,071 | Shaw | Nov. 2, 1886 |
| 633,225 | Thomas | Sept. 19, 1899 |
| 2,075,041 | Kliesrath | Mar. 30, 1937 |
| 2,173,973 | Leighton | Sept. 26, 1939 |
| 2,556,767 | McCann | June 12, 1951 |
| 2,631,844 | Paton | Mar. 17, 1953 |

FOREIGN PATENTS

| | | |
|---|---|---|
| 555,388 | Great Britain | Aug. 20, 1943 |